United States Patent
Yasuda et al.

(10) Patent No.: US 9,937,434 B2
(45) Date of Patent: Apr. 10, 2018

(54) PHOTOCHROMIC TOY

(75) Inventors: Michiyuki Yasuda, Aichi (JP); Yutaka Shibahashi, Aichi (JP); Yoshie Kamiya, Aichi (JP)

(73) Assignee: THE PILOT INK CO., LTD., Aichi (JP)

( * ) Notice: Subject to any disclaimer, the term of this patent is extended or adjusted under 35 U.S.C. 154(b) by 887 days.

(21) Appl. No.: 14/131,610

(22) PCT Filed: Jul. 13, 2012

(86) PCT No.: PCT/JP2012/068004
§ 371 (c)(1),
(2), (4) Date: Jan. 8, 2014

(87) PCT Pub. No.: WO2013/008936
PCT Pub. Date: Jan. 17, 2013

(65) Prior Publication Data
US 2014/0141689 A1    May 22, 2014

(30) Foreign Application Priority Data

Jul. 13, 2011   (JP) .................................. 2011-154488
Jun. 16, 2012   (JP) .................................. 2012-136454
Jun. 16, 2012   (JP) .................................. 2012-136455

(51) Int. Cl.
*A63H 33/22*    (2006.01)
*C09K 9/02*    (2006.01)
(Continued)

(52) U.S. Cl.
CPC .............. *A63H 33/22* (2013.01); *C09K 9/02* (2013.01); *C09K 11/0883* (2013.01);
(Continued)

(58) Field of Classification Search
CPC .................................................... A63H 33/22
See application file for complete search history.

(56) References Cited

U.S. PATENT DOCUMENTS 5,215,868 A * 6/1993 Taniguchi ............. G02F 1/0126
430/19
5,603,757 A * 2/1997 Mizuguchi ............ C09C 1/0015
106/403
(Continued)

FOREIGN PATENT DOCUMENTS

EP          0315224 A1 *  5/1989  ............... A63H 9/00
JP       2004167215 A     6/2004
(Continued)

OTHER PUBLICATIONS

International Search Report dated Oct. 2, 2012 from the International Searching Authority in counterpart application No. PCT/JP2012/068004.

(Continued)

*Primary Examiner* — Gene Kim
*Assistant Examiner* — Alyssa Hylinski
(74) *Attorney, Agent, or Firm* — Sughrue Mion, PLLC

(57) ABSTRACT

The present invention relates to a photochromic toy containing a light irradiator equipped with a light source and a toy main body containing a photochromic compound, in which the light source has a peak wavelength in the range of from 400 nm to 495 nm and the photochromic compound satisfies the following expression (1) between the integrated value of absorbance (x) in the range of from a wavelength showing a maximum absorbance in less than 400 nm to a wavelength of 400 nm and the integrated value of absorbance (y) in the wavelength range of from 400 nm to 700 nm.

$$y/x \geq 0.02 \tag{1}$$

11 Claims, 1 Drawing Sheet

(51) Int. Cl.
*C09K 11/08* (2006.01)
*C09K 11/77* (2006.01)

(52) U.S. Cl.
CPC ...... *C09K 11/7731* (2013.01); *C09K 11/7734* (2013.01); *C09K 11/7774* (2013.01)

(56) References Cited

U.S. PATENT DOCUMENTS

| | | | |
|---|---|---|---|
| 7,547,109 B2 | 6/2009 | Schmidt et al. | |
| 2004/0135097 A1* | 7/2004 | Shibahashi | A63H 33/22 250/474.1 |
| 2004/0185268 A1* | 9/2004 | Kumar | C07D 498/10 428/446 |
| 2004/0220001 A1* | 11/2004 | Oister | A63B 43/06 473/570 |
| 2007/0128972 A1* | 6/2007 | Schmidt | A63H 33/22 446/219 |
| 2008/0162162 A1* | 7/2008 | Reichelsheimer | B65D 27/00 705/1.1 |

FOREIGN PATENT DOCUMENTS

| | | |
|---|---|---|
| JP | 200762215 A | 3/2007 |
| JP | 200789823 A | 4/2007 |
| JP | 4174327 B2 | 10/2008 |
| JP | 2009172021 A | 8/2009 |

OTHER PUBLICATIONS

Written Opinion dated Oct. 2, 2012 from the International Searching Authority in counterpart application No. PCT/JP2012/068004.

* cited by examiner

PHOTOCHROMIC TOY

TECHNICAL FIELD

The present invention relates to a photochromic toy. More particularly, it relates to a photochromic toy set including a light irradiator and a toy main body employing a photochromic compound.

BACKGROUND ART

Color-changing devices which have been disclosed so far as devices for causing toys employing a photochromic compound to change in color include: an optically color-changing device in a weapon form which irradiates ultraviolet rays upon a photochromic toy; an optically color-changing device in display form which includes an ultraviolet light-emitting diode set in a vessel and which causes a photochromic toy placed on the vessel to change in color (see, for example, patent document 1); an optically color-changing device which includes an ultraviolet light-emitting diode set in a vessel and which causes a photochromic toy housed in the vessel to change in color (see, for example, patent document 2); a color-changing device which irradiates ultraviolet rays while moving, upon a photochromic toy to cause color change (see, for example, patent document 3); and an optically color-changing device in writing utensil form which irradiates ultraviolet rays and is capable of forming traces of handwriting on a photochromic writing board (see, for example, patent document 4).

Those optically color-changing devices can cause photochromic toys to change in color, without requiring sunlight irradiation, and hence are devices that have rendered color changes possible regardless of weather, time, or the place of use. However, since a light source which emits light including ultraviolet rays is employed in those optically color-changing devices in order to cause photochromic compounds to change in color, there is a fear about influences thereof on the human body.

RELATED ART DOCUMENTS

Patent Literature

Patent Document 1: JP-A-2004-167215
Patent Document 2: JP-A-2007-89823
Patent Document 3: JP-A-2009-172021
Patent Document 4: U.S. Pat. No. 7,547,109, description

SUMMARY OF THE INVENTION

Problems to be Solved by the Invention

The present invention is to provide a photochromic toy which not only is capable of causing photochromism regardless of weather, time, or the place of use, but also includes an optically color-changing device that exerts little influence on the human body and is highly safe because a light source which emits blue light is employed therein in order to cause the photochromic compound to change in color.

Means for Solving the Problems

The present invention relates to a photochromic toy containing:
a light irradiator equipped with a light source and
a toy main body containing a photochromic compound, in which
the light source has a peak wavelength in the range of from 400 nm to 495 nm and
the photochromic compound satisfies the following expression (1) between the integrated value of absorbance (x) in the range of from a wavelength showing a maximum absorbance in less than 400 nm to a wavelength of 400 nm and the integrated value of absorbance (y) in the wavelength range of from 400 nm to 700 nm.

$$y/x \geq 0.02 \tag{1}$$

Further, it is preferred that the toy main body contains a base and a photochromic layer and the photochromic layer contains the photochromic compound.

Further, it is preferred that the light source is an LED and that an ultraviolet-absorbing layer is further disposed on the surface of the light source.

In addition, it is preferred that the toy main body contains a photochromic microcapsule and the photochromic microcapsule encloses the photochromic compound and an ultraviolet absorber. In this case, the mass ratio of the photochromic compound to the ultraviolet absorber is preferably from 1:0.01 to 1:100.

Furthermore, it is preferred that a light-absorbing layer absorbing light having wavelengths of 400 nm or less is disposed on the toy main body. In this case, the light-absorbing layer preferably has a transmittance less than 5% at a wavelength of 390 nm.

Further, it is preferred that the light irradiator is further equipped with a solar cell, that the light irradiator is further equipped with a storage battery, that the toy main body is further equipped with an electric source and the electric source has been connected to the light source by wiring, that a stencil having light-shielding properties or a stencil including a layer which absorbs light having wavelengths in the range of from 400 to 495 nm is further equipped therewith, and that the photochromic layer further contains a phosphorescent material or a fluorescent material or a layer containing a phosphorescent material or a fluorescent material has been disposed beneath the photochromic layer.

Advantageous of the Invention

The present invention can provide a photochromic toy which not only makes it possible to cause photochromism regardless of weather, time, or the place of use but also includes an optically color-changing device that is highly safe because a light source which emits blue light is employed therein in order to cause the photochromic compound to change in color.

MODE FOR CARRYING OUT THE INVENTION

The photochromic toy of the present invention includes a light irradiator equipped with a light source and a toy main body containing a photochromic compound.

The light source provided to the light irradiator has a peak light emission wavelength in the range of from 400 to 495 nm and mainly emits blue light. Therefore, it exerts little influence on the human body and is highly safe because of emitting blue light, unlike the conventional light irradiators which emit ultraviolet light having a peak wavelength around 350 to 390 nm as a light source for causing photochromic compounds to satisfactorily change in color.

As the light source, use can be made of any of all light sources having the aforementioned peak light emission wavelength. However, it is preferred to use a blue light-emitting diode (LED).

Examples of the light-emitting diode include blue LED, product No. NSPB636CS (peak wavelength, 465 nm), manufactured by Nichia Kagaku Kogyo K.K.; blue LED, product No. KED471M31 (peak wavelength, 470 nm), manufactured by Kyosemi Corp.; blue LED, product No. SEDB16001A1 (peak wavelength, 460 nm), manufactured by Seiwa Electric Mfg. Co., Ltd.; purple LED, product No. KED405UH3 (peak wavelength, 405 nm), manufactured by Kyosemi Corp.; purple LED, product No. OSSV5111A (peak wavelength, 430 nm), manufactured by OPTOSUPPLY; and purple LED, product No. OSSV9131A (peak wavelength, 430 nm), manufactured by OPTOSUPPLY.

It is preferred that the light irradiator should have a main body on which the light source is mounted.

The main body is made of a material such as a plastic, rubber, glass, metal, stone, wood, etc., and is preferably made of a plastic.

Although the main body is for mounting the light source thereon, it is possible, according to need, to house therein an electric source for causing the light source to emit light or to dispose thereon a switch for voltage application.

Suitable for use as the electric source is a solar cell or a dry battery. The dry battery may be either a primary battery or a secondary battery.

By providing the electric source to the main body of the light irradiator, a portable light irradiator is obtained as a unit which is independent of the toy main body. By combining this light irradiator and the toy main body into a set, a photochromic toy can be obtained.

In the case where a solar cell is used as the electric source, light irradiation is rendered possible by means of sunlight and the outdoor use becomes possible. Furthermore, in the case of using a solar cell, use of a storage battery in combination with the solar cell makes it possible to generate electric power in sunlight and store the electricity in the storage battery and to thereby conduct light irradiation. Namely, light irradiation becomes possible either in sunlight or indoors. In this case, a light-absorbing layer which absorbs light having wavelengths of 400 nm or less may be disposed on the photochromic layer (i.e., on the toy main body containing a photochromic compound). Thus, the toy main body itself can be prevented from undergoing a color change due to sunlight. This configuration is suitable for outdoor use.

Moreover, the light-absorbing layer may have a transmittance less than 5%, preferably 4% or less, at a wavelength of 390 nm. This configuration can more effectively prevent the toy main body from undergoing a color change due to sunlight.

The light-absorbing layer includes layers containing an ultraviolet absorber.

Examples of the ultraviolet absorber include
2-(2H-benzotriazol-2-yl)-p-cresol,
2-(2-hydroxy-5-tert-butylphenyl)-2H-benzotriazole,
2-[5-methyl-2-hydroxyphenyl]benzotriazole,
2-(2-hydroxy-5-tert-octylphenyl)-2H-benzotriazole,
octyl-3-[3-tert-butyl-4-hydroxy-5-(5-chloro-2H-benzotriazol-2-yl)phenyl]propionate,
2-(3,5-di-tert-butyl-2-hydroxyphenyl)-5-chlorobenzotriazole,
2-(3,5-di-tert-butyl-2-hydroxyphenyl)benzotriazole,
2-(2H-benzotriazol-2-yl)-4,6-bis(1-methyl-1-phenylethyl)phenol,
2-[5-chloro-(2H)-benzotriazol-2-yl]-4-methyl-6-(tert-butyl)phenol,
2-(2H-benzotriazol-2-yl)-4,6-di-tert-pentylphenol,
2-(2H-benzotriazol-2-yl)-4,6-bis(1-methyl-1-phenylethyl)phenol,
2-(2H-benzotriazol-2-yl)-6-(1-methyl-1-phenylethyl)-4-(1,1,3,3-tetramethylbutyl)phenol,
2-(2H-benzotriazol-2-yl)-4-methyl-6-(3,4,5,6-tetrahydrophthalimidylmethyl)phenol,
2-(2H-benzotriazol-2-yl)-4-(1,1,3,3-tetramethylbutyl)phenol,
2,2'-methylenebis[6-(2H-benzotriazol-2-yl)-4-(1,1,3,3-tetramethylbutyl)phenol],
2-[2-hydroxyphenyl-3,5-di(1,1'-dimethylbenzyl)phenyl]-2H-benzotriazole,
2-[2-hydroxy-5-t-octylphenyl]-2H-benzotriazole,
2-[3-t-butyl-5-octyloxycarbonylethyl-2-hydroxyphenyl]benzotriazole,
2-[2-hydroxy-4-octoxyphenyl]benzotriazole,
a reaction product between methyl 3-(3-(2H-benzotriazol-2-yl)-5-tert-butyl-4-hydroxyphenyl)propionate and polyethylene glycol 300,
2-(2H-benzotriazol-2-yl)-6-dodecyl-4-methylphenol,
pentaerythritol tetrakis(2-cyano-3,3-diphenylacrylate),
2-cyano-3,3-diphenylacrylic acid ethyl ester,
ethyl 2-cyano-3,3-diphenylacrylate,
2'-ethylhexyl 2-cyano-3,3-diphenylacrylate,
2-(4,6-diphenyl-1,3,5-triazin-2-yl)-5-[(hexyl)oxy]phenol,
2-[4-[(2-hydroxy-3-(2'-ethyl)hexyl)oxy]-2-hydroxyphenyl]-4,6-bis(2,4-dimethylphenyl)-1,3,5-triazine,
2,4-bis(2-hydroxy-4-butyloxyphenyl)-6-(2,4-bisbutyloxyphenyl)-1,3,5-triazine,
2-(2-hydroxy-4-[1-octyloxycarbonylethoxy]phenyl)-4,6-bis(4-phenylphenyl)-1,3,5-triazine,
2,4-dihydroxybenzophenone,
2-hydroxy-4-methoxybenzophenone,
2-hydroxy-4-methoxybenzophenone-5-sulfonic acid trihydrate,
2,2-dihydroxy-4-methoxybenzophenone,
2-hydroxy-4-octyloxybenzophenone,
2-hydroxy-4-dodecyloxybenzophenone,
2-hydroxy-4-benzyloxybenzophenone,
2,2'-dihydroxy-4,4'-dimethoxybenzophenone,
2,2',4,4'-tetrahydroxybenzophenone,
bis(2-methoxy-4-hydroxy-5-benzoylphenyl)methane,
2-[2'-hydroxy-3',5'-di-tert-amylphenyl]benzophenone,
2-hyroxy-4-octadecyloxybenzophenone,
2-ethylhexyl 4-methoxycinnamate,
phenyl salicylate,
4-tert-butylphenyl salicylate,
4-octylphenyl salicylate,
2,4-di-tert-butylphenyl 3,5-di-tert-butyl-4-hydroxybenzoate,
2,4-di-tert-butylphenyl 4-hydroxybenzoate,
N-(2-ethoxyphenyl)-N'-(4-isododecylphenyl)ethanediamide,
2,2,4,4-tetramethyl-20-(β-lauryloxycarbonyl)ethyl-7-oxa-3,20-diazodispiro(5,1,11,2)heneicosan-21-one,
finely particulate zinc oxide, and finely particulate titanium oxide. Besides being used alone, they can be used in combination of two or more thereof.

In the case where the electric source is provided to the toy main body, it is preferred that the electric source provided to the toy main body should be electrically connected to the light irradiator with an electrical cord.

An electric source of the power generation type can also be used as the electric source. A motor type manual power generator can be provided to the main body of the light irradiator or to the toy main body and electrically connect to the light irradiator with an electrical cord.

Furthermore, a sound making member such as a speaker and a circuit board for electronic-sound control which causes the sound making member to emit desired electronic sounds can be housed in the main body of the light irradiator or in the toy main body.

The main body of the light irradiator may have any of various shapes depending on the form of the toy main body.

The photochromic toy having the configuration described above can be provided with a control mechanism which turns on the light source to emit light when the light source is in contact with the toy main body and which turns off the light source not to emit light when the light source is apart from the toy main body, thereby improving safety and reducing electric power consumption.

Examples of the control mechanism include: one in which a limit switch, photoelectric sensor, ultrasonic sensor, or the like is used to turn on or off the light source; and a lead switch which detects the magnetic force of a magnetic substance provided to the toy main body and which thereby turns on or off the light source.

It is also possible to provide the light source with an ultraviolet-absorbing layer which has a transparency and removes the ultraviolet rays emitted from the light source.

The ultraviolet-absorbing layer may be a molded object obtained by adding an appropriate amount of an ultraviolet absorber to a transparent resin such as an acrylic resin including poly(methyl methacrylate), a polycarbonate, a cycloolefin polymer, a polyimide, an epoxy resin, polystyrene, a polyester including poly(ethylene terephthalate), polypropylene, polyethylene, a vinyl chloride resin, or a silicone resin, and then molding them; or it may be formed by adding an ultraviolet absorber to a binder resin and applying them to the surface of the light source.

As the ultraviolet absorber, the same materials as those usable in the light-absorbing layer can be used.

The toy main body is a toy main body constituted of a material such as paper, synthetic paper, plastic, rubber, metal, glass, stone, wood, fabric, etc., and in which the material contains a photochromic compound added thereto or in which a photochromic layer containing a photochromic compound has been disposed on the base.

Specifically, a toy main body may be obtained by dispersing a photochromic compound in a vehicle to prepare a liquid material such as a coating material or a printing ink, and applying it by a printing technique such as screen printing, offset printing, gravure printing, coater printing, dabber printing, or transfer printing, or another technique such as brush coating, spray coating, electrostatic coating, electrodeposition, flow coating, roller coating, or dip coating, to form a photochromic layer on the base.

In this case, the material to be used may be a white, transparent, or translucent material, or may be a colored material in which a suitable amount of a color pigment that undergoes no color change coexists. It is also possible to use a material having a surface on which a colored layer has been disposed.

Furthermore, a molding resin obtained by blending a thermoplastic resin or a thermosetting resin with a photochromic compound can be molded to obtain a toy main body.

In this case, a color pigment which undergoes no color change can be caused to coexist in a suitable amount with the photochromic compound to make the photochroism about a variety of color changes.

Figure 1:
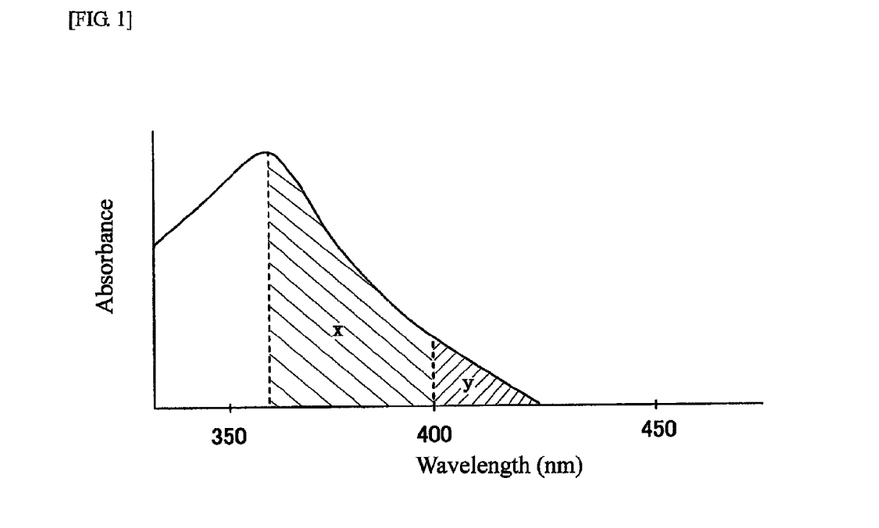
FIG. 1 is a graph showing a relationship between wavelength and absorbance in a photochromic compound.

The photochromic compound satisfies the following expression (1) between the integrated value of absorbance (x) in the range from a wavelength showing a maximum absorbance in less than 400 nm to a wavelength of 400 nm and the integrated value of absorbance (y) in the wavelength range of from 400 nm to 700 nm (see FIG. 1).

$$y/x \geq 0.02 \tag{1}$$

By satisfying expression (1), it exhibits photochromic properties for a light source having a peak wavelength in the range of from 400 to 495 nm and, upon the light irradiation, can give a viewable color density.

In the case where the value of y/x is less than 0.02, the photochromic compound, even when irradiated with light by using the light irradiator, does not develop a color or hardly develops a color, giving an insufficient color density, so that the user cannot visually recognize the color change and it is difficult for the photochromic toy to satisfy suitability for practical use.

The value of y/x is preferably 0.025 or larger, and more preferably 0.03 or larger.

Preferred for use as the photochromic compound are photochromic compounds which change in color with high sensitivity even when blue light is applied thereto, such as spirooxazine derivatives, spiropyran derivatives, and naphthopyran derivatives.

Specific examples of the photochromic compound include
1,3,3-trimethyl-6'-(2,3-dihydro-1-indolino)spiroindolinenaphthooxazine,
1,3,3-trimethyl-6'-(1-piperidinyl)spiroindolinenaphthooxazine,
1,3,3-trimethyl-6-trifluoromethyl-6'-(1-piperidinyl) spiroindolinenaphthooxazine,
1,3,3-trimethyl-6'-(1-piperidino)spiro[benzo[e]indoline-2,3'-[3H]naphtho[2,1-b][1,4]oxazine],
1,3,3-trimethyl-6'-indolinospiro[benzo[e]indoline-2,3'-[3H]naphtho[2,1-b][1,4]oxazine],
1,3,3-trimethyl-6'-morpholinospiro[benzo[e]indoline-2,3'-[3H]naphtho[2,1-b][1,4]oxazine],
1-ethyl-3,3-dimethylspiro[benzo[e]indoline-2,3'-[3H]naphtho[2,1-b][1,4]oxazine],
1,3,3-trimethyl-9'-methoxyspiro[benzo[e]indoline-2,3'-[3H]naphtho[2,1-b][1,4]oxazine],
1,3,3-trimethyl-8'-bromospiro[benzo[e]indoline-2,3'-[3H]naphtho[2,1-b][1,4]oxazine],
1-ethyl-3,3-dimethyl-6'-piperidinospiro[benzo[e]indoline-2,3'-[3H]naphtho[2,1-b][1,4]oxazine],
1-ethyl-3,3-dimethyl-6-morpholinospiro[benzo[e]indoline-2,3'-[3H]naphtho[2,1-b][1,4]oxazine],
1,3,3-trimethyl-8'-cyanospiro[benzo[e]indoline-2,3'-[3H]naphtho[2,1-b][1,4]oxazine],
1-ethyl-3,3-dimethyl-6'-indolinospiro[benzo[e]indoline-2,3'-[3H]naphtho[2,1-b][1,4]oxazine],
1,3,3-trimethylspiro[benzo[e]indoline-2,3'-[3H]quinolino[6,5-b][1,4]oxazine], 1-ethyl-3,3-dimethyl-8'-cyanospiro[benzo[e]indoline-2, 3'-[3H]naphtho[2,1-b][1,4]oxazine], 3,3,9,9-tetraphenyl-3H,9H-naphtho[2,1-b:6,5-b']dipyran, 3,3,10,10-tetraphenyl-3H,10H-naphtho[2,1-b:7,8-b']dipyran, 3,3,9,9-tetraphenyl-3H,10H-naphtho[4,3-b:8,7-b]dipyran, 3,3-diphenyl-9-methoxy-3H-naphtho[4,3-b]pyran, 3,3-diphenyl-10-methyl-3H-naphtho[2,1-b:5,6-b]dipyran-8-one, 3,3,9,9-tetra(4'-methoxyphenyl)-3H,9H-naphtho[2,1-b:6,5-b']dipyran, 3,3-diphenyl-8-(2-(4-dimethylamino)phenyl)ethene-3H-naphtho[4,3-b]pyran, 3,3-diphenyl-5-acetoxy-3H-naphtho[4,3-b]pyran, and 3,3-diphenyl-8-(1H-benzotriazol-1-yl)carbonyl-3H-naphtho[4,3-b]pyran.

Besides being used alone, they may be used in combination of two or more thereof.

Furthermore, the photochromic compound can be used in the form of a solution in a styrene-based oligomer, whereby it can be made to have improved light resistance and to show an improved color density.

The styrene-based oligomer to be used has a weight-average molecular weight of from 200 to 6,000, and preferably from 200 to 4,000. In the case where the styrene-based oligomer has a weight-average molecular weight less than 200, monomer content increases and stability becomes poor, making it difficult to produce the effect of improving the light resistance. Meanwhile, in the case where the weight-average molecular weight thereof exceeds 6,000, light irradiation results in a residual color, the color density decreases, and color-change sensitivity also decreases.

Incidentally, weight-average molecular weight is determined by GPC method (gel permeation chromatography).

Examples of the styrene-based oligomer include low-molecular polystyrene, styrene/α-methylstyrene copolymers, α-methylstyrene polymers, and copolymers of α-methylstyrene and vinyltoluene.

The mass ratio of the photochromic compound to the styrene-based oligomer is preferably from 1:1 to 1:10,000, and more preferably from 1:5 to 1:500.

By satisfying the aforementioned mass ratio, the effect of improving the light resistance is rendered excellent and the photochromic compound can be made to show a sufficient color density.

Furthermore, the photochromic compound can be made to have further improved light resistance by adding a hindered-amine-based light stabilizer thereto.

It is also possible to use a color-change sensitivity regulator together with the photochromic compound.

The color-change sensitivity regulator is an organic compound which has at least one functional group selected from a hydroxyl group, an ester group and a carboxyl group, and which has a boiling point of 150° C. or higher and a melting or softening point of 150° C. or lower.

Examples of the organic compound include aliphatic monohydric alcohols having 8 or more carbon atoms, aliphatic dihydric alcohols having 8 or more carbon atoms, aromatic alcohols having 7 or more carbon atoms, aliphatic esters having 7 or more carbon atoms, aromatic esters having 7 or more carbon atoms, aliphatic carboxylic acids having 6 or more carbon atoms, and aromatic carboxylic acids having 6 or more carbon atoms. Besides being used alone, they may be used in combination of two or more thereof.

The photochromic compound can be used by being enclosed in microcapsules thereby as a photochromic microcapsule pigment, or by being dispersed in a thermoplastic or thermosetting resin thereby as reversibly photochromic resin particles.

Similarly, the system including the photochromic compound and a styrene-based oligomer or the system which further includes a hindered-amine-based light stabilizer or a color-change sensitivity regulator can be enclosed in microcapsules to form a reversibly photochromic microcapsule pigment or be dispersed in a thermoplastic or thermosetting resin to form reversibly photochromic resin particles.

Incidentally, by using a photochromic microcapsule pigment containing the photochromic compound and an ultraviolet absorber both enclosed therein, coloring due to sunlight can be lessened.

The mass ratio of the photochromic compound to the ultraviolet absorber in the microcapsules is from 1:0.01 to 1:100, preferably from 1:0.1 to 1:50, and more preferably from 1:1 to 1:10.

By satisfying the aforementioned mass ratio, coloring due to sunlight can be further lessened, making it easy to satisfy suitability for practical outdoor use.

As the ultraviolet absorber, the same materials as those usable in the light-absorbing layer can be used.

Suitability for practical use is satisfied in the case where the microcapsules or the resin particles have an average particle diameter in the range of from 0.5 to 100 μm, preferably from 1 to 50 μm, and more preferably from 1 to 30 μm. In the case where the average particle diameter of the microcapsules exceeds 100 μm, it lacks dispersion stability or processability at the time of blending it into an ink, coating material or thermoplastic resin. On the other hand, in the case where the average particle diameter thereof is less than 0.5 μm, it becomes difficult to provide a coloring property having a high density.

The microcapsulation can be performed by interfacial polymerization of an isocyanate system, in situ polymerization of a melamine-formalin system, in-liquid curing coating, phase separation from an aqueous solution, phase separation from an organic solvent, a melting-dispersion-cooling method, air-suspension coating, spray drying, etc., and they are suitably selected in accordance with applications. The microcapsules may be further provided with a secondary resinous coating film on the surface in accordance with purposes to impart durability or may be modified the its surface properties, thereby subjected to practical use.

It is also possible to combine the photochromic toy containing the light irradiator and the toy main body, with either a stencil that has light-shielding properties or a stencil that includes a layer which absorbs light having wavelengths in the range of from 400 to 495 nm, thereby giving a photochromic toy set.

By irradiating light with interposing each stencil between the light irradiator and the toy main body, it can form arbitrarily a picture or pattern on the toy main body.

Examples of the stencils include stencils obtained by partly forming, on a transparent base, either a light-shielding layer or a layer which absorbs light having wavelengths in the range of from 400 to 495 nm.

In this case, by forming a layer which is a light-shielding layer or absorbs light having wavelengths in the range of from 400 to 495 nm and which is constituted of a picture having a photographic tone or of a pattern having gradation, a picture or pattern which gives a sense of three-dimensional object or a sense of high grade can be formed on the toy main body.

Furthermore, a left-eye image and a right-eye image which are for three-dimensional vision can be formed on the toy main body by means of stencils so that a three-dimensional image is visually recognized with a stereoscopic device.

Further, stencils obtained by cutting out some parts in either the stencil that has light-shielding properties or the stencil that includes a layer which absorbs light having wavelengths in the range of from 400 to 495 nm can be mentioned.

It is possible to incorporate a phosphorescent material or a fluorescent material into the toy main body containing the photochromic compound, or into the photochromic layer. Moreover, a layer containing a phosphorescent material or fluorescent material can be disposed beneath the photochromic layer.

In the system employing a phosphorescent material, when light is emitted from the light irradiator and irradiated upon the toy main body containing a photochromic compound or upon the photochromic layer, the phosphorescent material in the irradiated area emits light. In the system employing a fluorescent material, the fluorescent material in the irradiated area phosphoresces. As a result, it is possible to obtain a photochromic toy which comes to have unpredictability and has changeability because of the difference in appearance between the image visually recognized during light irradiation and the image which is formed by the photochromic compound after cessation of the light irradiation.

As the phosphorescent material, use can be made of a known material such as a CaS/Bi system, CaSrS/Bi system, ZnS/Cu system, ZnCdS/Cu system, or $SrAl_2O_4$/rare earth metal system.

Examples of the fluorescent material include fluorescent dyes (including fluorescent brighteners), fluorescent pigments in which fluorescent dyes have been fixed to a resin, and inorganic fluorescent materials such as $CaS:Eu^{2+}$, $CaSiN_2:Eu^{2+}$, $Sr_2Si_5N_8:Eu^{2+}$, $(Sr,Ca)_2SiO_4:Eu^{2+}$, $CaAlSiN_3:Eu^{2+}$, $SrCa_2S_4:Eu^{2+}$, $(Ba,Sr)_2SO_4:Eu^{2+}$, $Y_3Al_5O_{12}:Ce^{3+}$, and β-sialon (β-sialon:$Eu^{2+}$).

Besides being used alone, those phosphorescent materials or fluorescent materials may be used in combination of two or more thereof. It is also possible to use a phosphorescent material and a fluorescent material in combination.

EXAMPLES

Examples are given below. However, the present invention should not be construed as being limited to the following Examples.

In the Examples, "parts" means "parts by mass".

Method for Determining Peak Wavelength of Light Source of Light Irradiator

By using a spectrophotometer (Spectro Eye, manufactured by Gretag Macbeth AG), a reflection spectrum during light irradiation was determined by using a reflection spectrum for an unirradiated state as a reference. The difference in spectrum at each wavelength was converted to intensity in terms of ratio and the wavelength at which the intensity was the highest was taken as peak wavelength.

Measurement of Absorbance of Photochromic Compound and Determination of Integrated Value of Absorbance Thereof To 8,000 parts of ethanol was mixed 1 part of a photochromic compound and dissolved therein. The dissolved part was decanted and examined for absorbance in the wavelength range of from 320 to 700 nm with automatic recording spectrophotometer Type U-3210, manufactured by Hitachi Ltd. From the absorbance-wavelength characteristic graph obtained, the y/x ratio, which was the ratio between the integrated value of absorbance (x) in the range from a wavelength showing a maximum absorbance in less than 400 nm to a wavelength of 400 nm and the integrated value of absorbance (y) in the range of the wavelengths exceeding 400 nm, was calculated and determined in terms of areal ratio.

Method for Determining Transmittance of Light-Absorbing Layer

Each surface of a toy main body having a light-absorbing layer and a toy main body not having was examined for reflection spectrum at a wavelength of 390 nm by using a spectrophotometer (Spectro Eye, manufactured by Gretag Macbeth AG), and the transmittance was determined by using the following equation.

Transmittance={(value of reflection spectrum at wavelength 390 nm of the toy main body having light-absorbing layer)/(value of reflection spectrum at wavelength 390 nm in the absence of light-absorbing layer)}×100

With respect to other wavelengths, i.e., 400 nm and 410 nm, reflection spectrum at each wavelength was examined and the reflectance at each wavelength was determined in the same manner.

Example 1

Production of Light Irradiator

A battery as an electric source was built in a cylindrical main body (20 mm in diameter, 150 mm in length), an LED (peak wavelength, 430 nm) as a light source was attached to the tip, and a switch was provided to the surface part, to thereby obtain a light irradiator.

Production of Toy Main Body

In 50 parts of a 15% xylene solution of an acrylic resin (trade name Paraloid B-72, manufactured by Rohm & Hass Co.) was evenly dispersed 1 part of 1,3,3-trimethyl-6'-(1-piperidinyl)spiroindolinenaphthooxazine (y/x=0.03, x=46.12, y=1.39), and diluted by using xylene and methyl isobutyl ketone, thereby obtaining a photochromic coating material.

The photochromic coating material was applied with a spray gun to a miniature car made of white ABS to form a photochromic layer. Thus, a toy main body (photochromic miniature car) was obtained.

Regarding the photochromic toy configured of a combination of the light irradiator and the toy main body, when the toy main body was irradiated with light by using the light irradiator, the irradiated areas changed in color from white to purple. Then, it was subsequently allowed to stand in the dark and, as a result, it changed again in color to the original white. The changes were able to be repeatedly caused. Since the light source had a peak light emission wavelength of 430 nm and emitted blue light, a highly safe photochromic toy exerting little influence on the human body was able to be obtained.

Example 2

Production of Light Irradiator

A battery as an electric source was built in a cylindrical main body (25 mm in diameter, 200 mm in length), an LED (peak wavelength, 430 nm) as a light source was attached to the tip, and a switch was provided to the surface part, to thereby obtain a light irradiator.

Production of Toy Main Body

In microcapsules made of a urethane resin were encapsulated 1 part of 1,3,3-trimethyl-6-trifluoromethylindolino-6'-(1-piperidinyl)naphthooxazine (y/x=0.06, x=60.92, y=3.62) and 15 parts of a styrene/α-methylstyrene copolymer (trade name Piccolastic A-5, manufactured by Eastman Kodak Co.), thereby obtaining a photochromic microcapsule pigment (average particle diameter, 10 μm).

In 70 parts of a 15% xylene solution of an acrylic resin (trade name Paraloid B-72, manufactured by Rohm & Hass Co.) was evenly dispersed 10 parts of the photochromic microcapsule pigment, and diluted by using xylene and methyl isobutyl ketone, thereby obtaining a photochromic coating material.

The photochromic coating material was applied with a spray gun, so as to form a star shape, to the head of a doll made of flesh-colored polyvinyl chloride as a base, thereby forming a photochromic layer (photochromic image). Thus, a toy main body (photochromic doll) was obtained.

Regarding the photochromic toy configured of a combination of the light irradiator and the toy main body, when the toy main body was irradiated with light by using the light irradiator, the irradiated areas changed in color from the flesh color to red, resulting in the appearance of a star-shaped image. Then, it was subsequently allowed to stand in the dark and, as a result, it changed again in color to the original flesh color. The changes were able to be repeatedly caused. Since the light source had a peak light emission wavelength of 430 nm and emitted blue light, a highly safe photochromic toy exerting little influence on the human body was able to be obtained.

Example 3

Production of Light Irradiator

A battery as an electric source was built in a cylindrical main body (100 mm in diameter, 250 mm in length) which had a hollow inside, an LED (peak wavelength, 430 nm) as a light source was attached to its upper part so as to enable light emission toward the inside hollow, and a switch was provided to the surface part, to thereby obtain a light irradiator.

Production of Toy Main Body

In microcapsules made of a urethane resin were encapsulated 2 parts of 1,3,3-trimethyl-8'-cyanospiro[benzo[e]indoline-2,3'-[3H]naphtho[2,1-b][1,4]oxazine] (y/x=0.09, x=18.59, y=1.67) and 15 parts of a styrene/α-methylstyrene copolymer (trade name Piccolastic A-75, manufactured by Eastman Kodak Co.), thereby obtaining a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to thereby obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an aqueous dispersion type ultraviolet absorber (product name Tinuvin 400-DW, manufactured by BASF A.G.), 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm.

The photochromic fabric was cut and sewed to produce a dress for dolls. Thus, a toy main body (photochromic garment for dolls) was obtained.

Regarding the photochromic toy configured of a combination of the light irradiator and the toy main body, when the toy main body was placed inside the light irradiator and irradiated with light, the irradiated areas thereof changed in color from white to blue. Then, it was subsequently allowed to stand in the dark and, as a result, it changed again in color to the original white. The changes were able to be repeatedly caused. Since the light source had a peak light emission wavelength of 430 nm and emitted blue light, a highly safe photochromic toy exerting little influence on the human body was able to be obtained.

Figure 2:
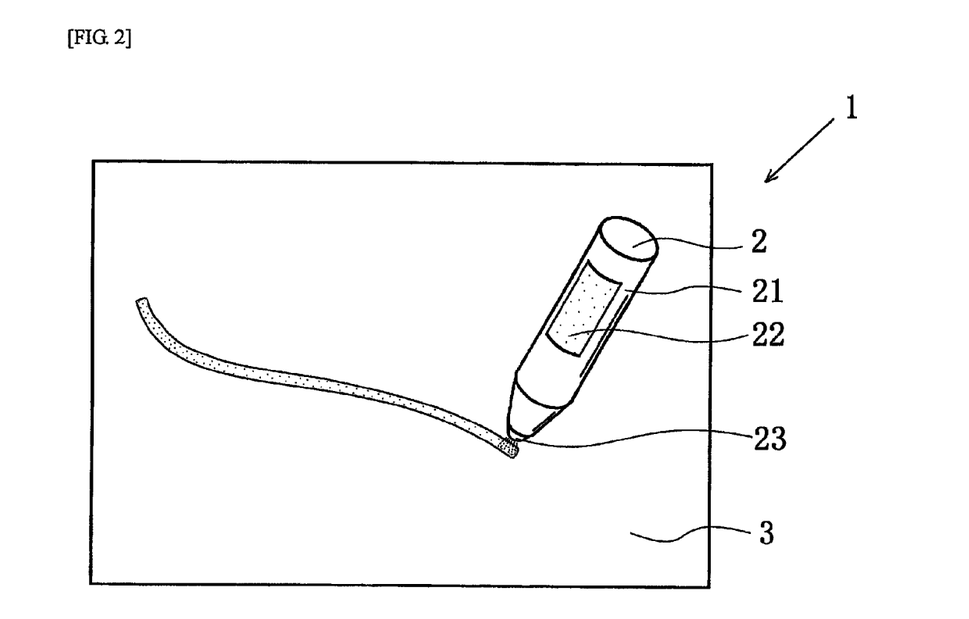
FIG. 2 is a view illustrating one example of the photochromic toy of the present invention.

Example 4 (See FIG. 2)

Production of Light Irradiator

A solar cell as an electric source 22 was provided to the surface of a cylindrical main body 21 (15 mm in diameter, 130 mm in length), an LED (peak wavelength, 430 nm) as a light source 23 was attached to the tip, to thereby obtain a light irradiator 2.

This light irradiator is capable of light irradiation in sunlight.

Production of Toy Main Body

In microcapsules made of a urethane resin were enclosed 2 parts of 1,3,3-trimethyl-8'-cyanospiro[benzo[e]indoline-2,3'-[3H]naphtho[2,1-b][1,4]oxazine] (y/x=0.09, x=18.59, y=1.67) and 15 parts of a styrene/α-methylstyrene copolymer (trade name Piccolastic A-75, manufactured by Eastman Kodak Co.), thereby obtaining a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an aqueous dispersion type ultraviolet absorber (product name Tinuvin 477-DW, manufactured by BASF A.G.), 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm.

The photochromic fabric was cut and sewed to obtain a flat toy main body 3 (photochromic sheet).

Regarding the photochromic toy 1 configured of a combination of the light irradiator and the toy main body, when the toy main body was irradiated with light by using the light irradiator, the irradiated areas changed in color from white to blue and letters were able to be formed. Then, it was subsequently allowed to stand in the dark and, as a result, the blue letters disappeared and changed in color to the original white. The changes were able to be repeatedly caused. Since the light source had a peak light emission wavelength of 430 nm and emitted blue light, a highly safe photochromic toy exerting little influence on the human body was able to be obtained.

Although the toy main body slightly changed in color to blue in sunlight, it was substantially impossible to recognize with the naked eye. Upon irradiating with the light from the light irradiator in this state, the irradiated areas changed in color to deep blue, and letters and images were able to be formed. Upon cessation of the light irradiation, the blue letters and images gradually became invisible. The suitability for repeated practical use in sunlight was satisfied.

Example 5

Production of Light Irradiator

A storage battery was built in a cylindrical main body (15 mm in diameter, 130 mm in length), a solar cell was provided to the surface of the main body, an LED (peak wavelength, 430 nm) as a light source was attached to the tip, to thereby obtain a light irradiator.

This light irradiator generates electric power in sunlight, and stores the electricity in the storage battery and usable for light irradiation. Thus, it is capable of light irradiation either in sunlight or indoors.

Production of Toy Main Body

In microcapsules made of a urethane resin were encapsulated 1 part of 1-ethyl-3,3-dimethyl-6-trifluoromethylindolino-6'-(−1-morpholino)naphthooxazine (y/x=0.06, x=60.92, y=3.62), 15 parts of a styrene/α-methylstyrene copolymer (trade name Piccolastic A-5, manufactured by Eastman Kodak Co.), and 1 part of a light stabilizer, thereby obtaining a photochromic microcapsule pigment (average particle diameter, 10 μm).

With 5 parts of the photochromic microcapsule pigment were mixed 10 parts of an acrylic resin emulsion, 0.5 parts of an antifoamer, and 1 part of a viscosity regulator, to obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an ultraviolet absorber (product name Tinuvin PS, manufactured by BASF A.G.), 6 parts of a 50% xylene solution of an acrylic resin, 0.1 part of an antifoamer, 2 parts of xylene, and 2 parts of methyl isobutyl ketone was applied by screen printing, so as to form a heart shape, thereby forming a light-absorbing layer (light-absorbing image). Thus, photochromic fabric was obtained.

The light-absorbing layer had a transmittance of 1% at a wavelength of 390 nm.

The photochromic fabric was cut and sewed to obtain a flat toy main body (photochromic sheet).

Regarding the photochromic toy configured of a combination of the light irradiator and the toy main body, when the toy main body was irradiated with light by using the light irradiator, the irradiated areas changed in color from white to red. Then, it was subsequently allowed to stand in the dark and, as a result, the red color disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Although the area surrounding the heart shape changed in color to red and the heart-shaped portion slightly changed in color to red in sunlight, it was substantially impossible to recognize with the naked eye. Upon irradiating with the light from the light irradiator to the heart-shaped portion in this state, the irradiated areas changed in color to deep red. Upon cessation of the light irradiation, the red color gradually became invisible. The suitability for repeated practical use in sunlight was satisfied.

Example 6

Production of Light Irradiator

An LED (peak wavelength, 430 nm) as a light source was attached to the tip of a cylindrical main body (15 mm in diameter, 130 mm in length), a switch was provided to the surface part, and an electrical cord was disposed so as to extend from a rear part of the main body, to thereby obtain a light irradiator.

Production of Toy Main Body

In microcapsules made of a urethane resin were encapsulated 2 parts of 1,3,3-trimethyl-8'-cyanospiro[benzo[e]indoline-2,3'-[3H]naphtho[2,1-b][1,4]oxazine] (y/x=0.09, x=18.56, y=1.67) and 15 parts of a styrene/α-methylstyrene copolymer (trade name Piccolastic A-75, manufactured by Eastman Kodak Co.), thereby obtaining a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an aqueous dispersion type ultraviolet absorber (product name Tinuvin 477-DW, manufactured by BASF A.G.), 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm.

The photochromic fabric was cut and sewed to produce a flat toy main body (photochromic sheet), and to part of the periphery thereof, a power source box having a built-in battery was provided.

The electrical cord of the light irradiator was electrically connected to the power source box of the toy main body, to obtain a photochromic toy.

Regarding this photochromic toy, when the toy main body was irradiated with light by using the light irradiator, the irradiated areas changed in color from white to blue and letters were able to be formed. Then, it was subsequently allowed to stand in the dark and, as a result, the blue letters disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Although the toy main body slightly changed in color to blue in sunlight, it was substantially impossible to recognize with the naked eye. Upon irradiating with the light from the light irradiator in this state, the irradiated areas changed in color to deep blue, and letters and images were able to be formed. Upon cessation of the light irradiation, the blue letters and images gradually became invisible. The suitability for repeated practical use in sunlight was satisfied.

Example 7

Production of Light Irradiator

An LED (peak wavelength, 430 nm) as a light source was attached to the tip of a cylindrical main body (15 mm in diameter, 130 mm in length), a switch was provided to the surface part, and an electrical cord was disposed so as to extend from a rear part of the main body, to thereby obtain a light irradiator.

Production of Toy Main Body

In microcapsules made of a urethane resin were encapsulated 2 parts of 1,3,3-trimethyl-8'-cyanospiro[benzo[e]indoline-2,3'-[3H]naphtho[2,1-b][1,4]oxazine] (y/x=0.09, x=18.56, y=1.67) and 15 parts of a styrene/α-methylstyrene copolymer (trade name Piccolastic A-75, manufactured by Eastman Kodak Co.), thereby obtaining a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an aqueous dispersion type ultraviolet absorber (product name Tinuvin 477-DW, manufactured by BASF A.G.), 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm.

The photochromic fabric was cut and sewed to produce a flat toy main body (photochromic sheet), and to part of the periphery thereof, a motor type manual power generator was provided.

The electrical cord of the light irradiator was electrically connected to the motor type manual power generator of the toy main body, to obtain a photochromic toy.

Regarding this photochromic toy, when the toy main body was irradiated with light by using the light irradiator, the irradiated areas changed in color from white to blue and letters were able to be formed. Then, it was subsequently allowed to stand in the dark and, as a result, the blue letters disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Although the toy main body slightly changed in color to blue in sunlight, it was substantially impossible to recognize with the naked eye. Upon irradiating with the light from the light irradiator in this state, the irradiated areas changed in color to deep blue, and letters and images were able to be formed. Upon cessation of the light irradiation, the blue letters and images gradually became invisible. The suitability for repeated practical use in sunlight was satisfied.

Example 8

Production of Light Irradiator

A battery as an electric source was built in a main body made of a plastic, an LED (peak wavelength, 460 nm) as a light source was attached to the tip, and a switch was provided to the surface part, to thereby obtain a light irradiator.

Production of Toy Main Body

In microcapsules made of a urethane resin were encapsulated 1 part of 1,3,3-trimethyl-6'-(2,3-dihydro-1-indolino)spiroindolinenaphthooxazine (y/x=0.93, x=15.41, y=14.3) and 15 parts of a styrene/α-methylstyrene copolymer (trade name Piccolastic A-5, manufactured by Eastman Kodak Co.), thereby obtaining a photochromic microcapsule pigment (average particle diameter, 10 μm).

In 70 parts of a 15% xylene solution of an acrylic resin (trade name Paraloid B-72, manufactured by Rohm & Hass Co.) was dispersed 10 parts of the photochromic microcapsule pigment, and diluted by using xylene and methyl isobutyl ketone, thereby obtaining a photochromic coating material.

The photochromic coating material was applied with a spray gun, so as to form a heart pattern, to the surface of a duck-shaped molded object made of yellow polyvinyl chloride as a base, thereby forming a photochromic layer (photochromic image). Thus, a toy main body (photochromic figure) was obtained.

Regarding the photochromic toy configured of a combination of the light irradiator and the toy main body, when the toy main body was irradiated with light by using the light irradiator, a brown heart pattern appeared in the irradiated areas. Then, it was subsequently allowed to stand in the dark and, as a result, it changed again in color to the original yellow. The changes were able to be repeatedly caused. Since the light source had a peak light emission wavelength of 460 nm and emitted blue light, a highly safe photochromic toy exerting little influence on the human body was able to be obtained.

Example 9

Production of Stencil Sheet

An orange polyvinyl chloride sheet containing an ultraviolet absorber (product name Tinuvin 328, manufactured by BASF A.G.) was produced, and a star-shaped portion was cut out thereof, to thereby obtain a stencil sheet.

Production of Photochromic Toy Set

Combined with the photochromic toy produced in Example 4, a photochromic toy set was obtained.

Regarding this photochromic toy set, when the stencil sheet was placed on the toy main body and they were irradiated with light by using the light irradiator, the irradiated areas changed in color from white to blue and a star-shaped image due to the stencil sheet was able to be formed. Then, it was subsequently allowed to stand in the dark and, as a result, the star-shaped image disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Example 10

Production of Light Irradiator

With 1 part of an ultraviolet absorber (product name Tinuvin PS, manufactured by BASF A.G.) were mixed 50 parts of a 50% xylene solution of an acrylic resin and 10 parts of an isocyanate-based hardener, to thereby obtain an ultraviolet-absorbing ink.

The ultraviolet-absorbing ink was applied to the surface of an LED (peak wavelength, 405 nm) to form an ultraviolet-absorbing layer.

A battery as an electric source was built in a cylindrical main body (20 mm in diameter, 150 mm in length), the LED as a light source was attached to the tip, and a switch was provided to the surface part, to thereby obtain a light irradiator.

Production of Toy Main Body

In microcapsules made of a urethane resin were encapsulated 1 part of 1,3,3-trimethyl-6'-(2,3-dihydro-1-indolino) spiroindolinenaphthooxazine (y/x=0.93, x=15.41, y=14.3) and 15 parts of a styrene/α-methylstyrene copolymer (trade name Piccolastic A-5, manufactured by Eastman Kodak Co.), thereby obtaining a photochromic microcapsule pigment (average particle diameter, 10 μm).

In 70 parts of a 15% xylene solution of an acrylic resin (trade name Paraloid B-72, manufactured by Rohm & Hass Co.) was dispersed 10 parts of the photochromic microcapsule pigment, and diluted by using xylene and methyl isobutyl ketone, thereby obtaining a photochromic coating material.

The photochromic coating material was applied with a spray gun, so as to form a heart pattern, to the surface of a duck-shaped molded object made of yellow polyvinyl chloride as a base, thereby forming a photochromic layer (photochromic image). Thus, a toy main body (photochromic figure) was obtained.

Regarding the photochromic toy configured of a combination of the light irradiator and the toy main body, when the toy main body was irradiated with light by using the light irradiator, a brown heart pattern appeared in the irradiated areas. Then, it was subsequently allowed to stand in the dark and, as a result, it changed again in color to the original yellow. The changes were able to be repeatedly caused. Although having a peak light emission wavelength of 405 nm, the light source emitted blue light resulting from absorption of the ultraviolet rays by the ultraviolet-absorbing layer. Thus, a highly safe photochromic toy exerting less influence on the human body was able to be obtained.

Example 11

Production of Light Irradiator

A battery as an electric source was built in a cylindrical main body (20 mm in diameter, 150 mm in length), an LED (peak wavelength, 430 nm) as a light source was attached to the tip, and a switch was provided to the surface part, to thereby obtain a light irradiator.

Production of Toy Main Body

In 50 parts of a 15% xylene solution of an acrylic resin (trade name Paraloid B-72, manufactured by Rohm & Hass Co.) was evenly dispersed 1 part of 3,3,9,9-tetraphenyl-3H,9H-naphtho[2,1-b:6,5-b']dipyran (y/x=0.12, x=21.30, y=2.56), and diluted by using xylene and methyl isobutyl ketone, thereby obtaining a photochromic coating material.

The photochromic coating material was applied with a spray gun to a miniature car made of white ABS to form a photochromic layer. Thus, a toy main body (photochromic miniature car) was obtained.

Regarding the photochromic toy configured of a combination of the light irradiator and the toy main body, when the toy main body was irradiated with light by using the light irradiator, the irradiated areas changed in color from white to orange. Then, it was subsequently allowed to stand in the dark and, as a result, it changed again in color to the original white. The changes were able to be repeatedly caused. Since the light source had a peak light emission wavelength of 430 nm and emitted blue light, a highly safe photochromic toy exerting little influence on the human body was able to be obtained.

Example 12

Production of Light Irradiator

A battery as an electric source was built in a cylindrical main body (25 mm in diameter, 200 mm in length), an LED (peak wavelength, 430 nm) as a light source was attached to the tip, and a switch was provided to the surface part, to thereby obtain a light irradiator.

Production of Toy Main Body

In microcapsules made of a urethane resin were encapsulated 1 part of 3,3,10,10-tetraphenyl-3H,10H-naphtho[2,1-b:7,8-b']dipyran (y/x=0.23, x=24.13, y=5.55) and 15 parts of a styrene/α-methylstyrene copolymer (trade name Piccolastic A-5, manufactured by Eastman Kodak Co.), thereby obtaining a photochromic microcapsule pigment (average particle diameter, 10 μm).

In 70 parts of a 15% xylene solution of an acrylic resin (trade name Paraloid B-72, manufactured by Rohm & Hass Co.) was evenly dispersed 10 parts of the photochromic microcapsule pigment, and diluted by using xylene and methyl isobutyl ketone, thereby obtaining a photochromic coating material.

The photochromic coating material was applied with a spray gun, so as to form a star shape, to the head of a doll made of flesh-colored polyvinyl chloride as a base, thereby forming a photochromic layer (photochromic image). Thus, a toy main body (photochromic doll) was obtained.

Regarding the photochromic toy configured of a combination of the light irradiator and the toy main body, when the toy main body was irradiated with light by using the light irradiator, the irradiated areas changed in color from the flesh color to yellow, resulting in the appearance of a star-shaped image. Then, it was subsequently allowed to stand in the dark and, as a result, it changed again in color to the original flesh color. The changes were able to be repeatedly caused. Since the light source had a peak light emission wavelength of 430 nm and emitted blue light, a highly safe photochromic toy exerting little influence on the human body was able to be obtained.

Example 13

Production of Light Irradiator

A solar cell as an electric source was provided to the surface in a cylindrical main body (15 mm in diameter, 130 mm in length) and an LED (peak wavelength, 430 nm) as a light source was attached to the tip, to thereby obtain a light irradiator.

This light irradiator is capable of light irradiation in sunlight.

Production of Toy Main Body

In microcapsules made of a urethane resin were encapsulated 2 parts of 3,3-diphenyl-8-(2-(4-dimethylamino)phenyl)ethylenyl-3H-naphtho[4,3-b]pyran (y/x=0.27, x=71.13, y=19.20) and 15 parts of a styrene/α-methylstyrene copolymer (trade name Piccolastic A-75, manufactured by Eastman Kodak Co.), thereby obtaining a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to thereby obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an aqueous dispersion type ultraviolet absorber (product name Tinuvin 400-DW, manufactured by BASF A.G.), 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm, a transmittance of 19% at a wavelength of 400 nm, and a transmittance of 41% at a wavelength of 410 nm.

The photochromic fabric was cut and sewed to obtain a flat toy main body (photochromic sheet).

Regarding the photochromic toy configured of a combination of the light irradiator and the toy main body, when the toy main body was irradiated with light by using the light irradiator, the irradiated areas changed in color from white to dark red and letters were able to be formed. Then, it was subsequently allowed to stand in the dark and, as a result, the dark-red letters disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Although the toy main body slightly changed in color to dark red in sunlight, it was substantially impossible to recognize with the naked eye. Upon irradiating with the light from the light irradiator in this state, the irradiated areas changed in color to deep dark red, and letters and images were able to be formed. Upon cessation of the light irradiation, the dark-red letters and images gradually became invisible. The suitability for repeated practical use in sunlight was satisfied.

Example 14

Production of Light Irradiator

A battery as an electric source was built in a main body made of a plastic, an LED (peak wavelength, 460 nm) as a light source was attached to the tip, and a switch was provided to the surface part, to thereby obtain a light irradiator.

Production of Toy Main Body

In microcapsules made of a urethane resin were encapsulated 1 part of 3,3-diphenyl-8-(1H-benzotriazol-1-yl)carbonyl-3H-naphtho[4,3-b]pyran (y/x=0.06, x=18.20, y=1.09) and 15 parts of a styrene/α-methylstyrene copolymer (trade name Piccolastic A-5, manufactured by Eastman Kodak Co.), thereby obtaining a photochromic microcapsule pigment (average particle diameter, 10 μm).

In 70 parts of a 15% xylene solution of an acrylic resin (trade name Paraloid B-72, manufactured by Rohm & Hass Co.) was dispersed 10 parts of the photochromic microcapsule pigment, and diluted by using xylene and methyl isobutyl ketone, thereby obtaining a photochromic coating material.

The photochromic coating material was applied with a spray gun, so as to form a heart pattern, to the surface of a swan-shaped molded object made of white polyvinyl chloride as a base, thereby forming a photochromic layer (photochromic image). Thus, a toy main body (photochromic figure) was obtained.

Regarding the photochromic toy configured of a combination of the light irradiator and the toy main body, when the toy main body was irradiated with light by using the light irradiator, a yellow heart pattern appeared in the irradiated areas. Then, it was subsequently allowed to stand in the dark and, as a result, it changed again in color to the original white. The changes were able to be repeatedly caused. Since the light source had a peak light emission wavelength of 460 nm and emitted blue light, a highly safe photochromic toy exerting little influence on the human body was able to be obtained.

Example 15

Production of Light Irradiator

A solar cell as an electric source was provided to the surface in a cylindrical main body (15 mm in diameter, 130 mm in length), and an LED (peak wavelength, 430 nm) as a light source was attached to the tip, to thereby obtain a light irradiator.

This light irradiator is capable of light irradiation in sunlight.

Production of Toy Main Body

In microcapsules made of a urethane resin were encapsulated 2 parts of 3,3,9,9-tetraphenyl-3H,9H-naphtho[2,1-b:6,5-b']dipyran (y/x=0.12, x=21.30, y=2.56) and 15 parts of a styrene/α-methylstyrene copolymer (trade name Piccolastic A-75, manufactured by Eastman Kodak Co.), thereby obtaining a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to thereby obtain a photochromic ink.

The photochromic ink was printed by screen printing on the whole of a surface of white fabric as a base to form a photochromic layer. Furthermore, to the upper surface thereof, a colorless topcoating agent obtained by mixing 5 parts of an ultraviolet absorber (trade name Tinuvin 328, manufactured by BASF A.G.), 20 parts of a xylene solution of an acrylic resin, 1 part of an antifoamer, and 2 parts of a viscosity regulator was applied to the surface of the photochromic layer by screen printing to form a light-absorbing layer. Thus, photochromic fabric was obtained.

The light-absorbing layer had a transmittance of 4% at a wavelength of 390 nm, a transmittance of 6% at a wavelength of 400 nm, and a transmittance of 20% at a wavelength of 410 nm.

The photochromic fabric was cut and sewed to obtain a flat toy main body (photochromic sheet).

Regarding the photochromic toy configured of a combination of the light irradiator and the toy main body, when the toy main body was irradiated with light by using the light irradiator, the irradiated areas changed in color from white to orange and letters were able to be formed. Then, it was subsequently allowed to stand in the dark and, as a result, the orange letters disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Although the toy main body slightly changed in color to orange in sunlight, it was substantially impossible to recognize with the naked eye. Upon irradiating with the light from the light irradiator in this state, the irradiated areas changed in color to deep orange, and letters and images were able to be formed. Upon cessation of the light irradiation, the orange letters and images gradually became invisible. The suitability for repeated practical use in sunlight was satisfied.

Example 16

Production of Light Irradiator

A battery as an electric source was built in a cylindrical main body (100 mm in diameter, 250 mm in length) which had a hollow inside, an LED (peak wavelength, 430 nm) as a light source was attached to its upper part so as to enable light emission toward the inside hollow, and a switch was provided to the surface part, to obtain a light irradiator.

Production of Toy Main Body

With 2 parts of a phosphorescent pigment (GSS, manufactured by Nemoto & Co., Ltd.) were mixed 6 parts of an acrylic resin emulsion, 0.5 parts of an antifoamer, and 1 part of a viscosity regulator to produce a phosphorescent ink, and it was printed by screen printing on the whole of a surface of white fabric to form a phosphorescent layer.

In microcapsules made of a urethane resin were encapsulated 2 parts of 3,3-diphenyl-8-(1H-benzotriazol-1-yl)carbonyl-3H-naphtho[4,3-b]pyran (y/x=0.06, x=18.20, y=1.09) and 15 parts of a styrene/α-methylstyrene copolymer (trade name Piccolastic A-75, manufactured by Eastman Kodak Co.), thereby obtaining a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to thereby obtain a photochromic ink.

The photochromic ink was printed by screen printing on the whole surface of the phosphorescent layer to form a photochromic layer. Furthermore, to the upper surface thereof, a colorless topcoating agent obtained by mixing 3 parts of an aqueous dispersion type ultraviolet absorber (trade name Tinuvin 99-DW, manufactured by BASF A.G.), 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm, a transmittance of 19% at a wavelength of 400 nm, and a transmittance of 41% at a wavelength of 410 nm.

The photochromic fabric was cut and sewed to obtain a flat toy main body (photochromic sheet).

Regarding the photochromic toy configured of a combination of the light irradiator and the toy main body, when the toy main body was irradiated with light by using the light irradiator, the phosphorescent pigment in the irradiated areas emitted light of a green color, and the traces of handwriting changed in color from white to orange and letters were able to be formed. Then, it was subsequently allowed to stand in the dark and, as a result, the orange letters disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Although the toy main body slightly changed in color to orange in sunlight, it was substantially impossible to recognize with the naked eye. Upon irradiating with the light from the light irradiator in this state, the irradiated areas changed in color to deep orange, and letters and images were able to be formed. Upon cessation of the light irradiation, the orange letters and images gradually became invisible. The suitability for repeated practical use in sunlight was satisfied.

Example 17

Production of Light Irradiator

A battery as an electric source was built in a cylindrical main body (25 mm in diameter, 200 mm in length), an LED (peak wavelength, 430 nm) as a light source was attached to the tip, and a switch was provided to the surface part, to thereby obtain a light irradiator.

Production of Toy Main Body

In microcapsules made of a urethane resin were encapsulated 1 part of 1,3,3-trimethyl-6-trifluoromethylindolino-6'-(1-piperidinyl)naphthooxazine (y/x=0.06, x=60.92, y=3.62), 15 parts of a styrene/α-methylstyrene copolymer (trade name Piccolastic A-5, manufactured by Eastman Kodak Co.), and 10 parts of 2-(2H-benzotriazol-2-yl)-4,6-di-tert-pentylphenol, thereby obtaining a photochromic microcapsule pigment (average particle diameter, 10 μm).

In 70 parts of a 15% xylene solution of an acrylic resin (trade name Paraloid B-72, manufactured by Rohm & Hass Co.) was evenly dispersed 10 parts of the photochromic microcapsule pigment, and diluted by using xylene and methyl isobutyl ketone, thereby obtaining a photochromic coating material.

The photochromic coating material was applied with a spray gun, so as to form a star shape, to the head of a doll made of flesh-colored polyvinyl chloride as a base, thereby forming a photochromic layer (photochromic image). Thus, a toy main body (photochromic doll) was obtained.

Regarding the photochromic toy configured of a combination of the light irradiator and the toy main body, when the toy main body was irradiated with light by using the light irradiator, the coloration due to sunlight had been lessened and the irradiated areas changed in color from the flesh color to deep red, resulting in the appearance of a star-shaped image. Then, it was subsequently allowed to stand in the dark and, as a result, it changed again in color to the original flesh color. The changes were able to be repeatedly caused. Since the light source had a peak light emission wavelength of 430 nm and emitted blue light, a highly safe photochromic toy exerting little influence on the human body was able to be obtained.

Example 18

Production of Light Irradiator

A solar cell as an electric source was provided to the surface in a cylindrical main body (15 mm in diameter, 130 mm in length), and an LED (peak wavelength, 430 nm) as a light source was attached to the tip, to thereby obtain a light irradiator.

This light irradiator is capable of light irradiation in sunlight.

Production of Toy Main Body

In microcapsules made of a urethane resin were encapsulated 2 parts of 1,3,3-trimethyl-8'-cyanospiro[benzo[e]indoline-2,3'-[3H]naphtho[2,1-b][1,4]oxazine] (y/x=0.09, x=18.59, y=1.67), 15 parts of a styrene/α-methylstyrene copolymer (trade name Piccolastic A-75, manufactured by Eastman Kodak Co.), and 0.5 parts of 2-[5-chloro-(2H)-benzotriazol-2-yl]-4-methyl-6-(tert-butyl)phenol, thereby obtaining a photochromic microcapsule pigment (average particle diameter, 10 µm).

With 5 parts of the photochromic microcapsule pigment were mixed 6 parts of an acrylic resin emulsion, 0.5 parts of an antifoamer, and 1 part of a viscosity regulator, to thereby obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an aqueous dispersion type ultraviolet absorber, 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm.

The photochromic fabric was cut and sewed to produce a flat toy main body (photochromic sheet).

Regarding the photochromic toy configured of a combination of the light irradiator and the toy main body, when the toy main body was irradiated with light by using the light irradiator, the irradiated areas changed in color from white to blue and letters were able to be formed. Then, it was subsequently allowed to stand in the dark and, as a result, the blue letters disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

The toy main body changed little in color in sunlight, and upon irradiating with the light from the light irradiator in this state, the irradiated areas changed in color to deep blue and letters and images were able to be formed. Upon cessation of the light irradiation, the blue letters and images gradually became invisible. The suitability for repeated practical use in sunlight was satisfied.

Example 19

Production of Light Irradiator

A storage battery was built in a cylindrical main body (15 mm in diameter, 130 mm in length), a solar cell was provided to the surface of the main body, and an LED (peak wavelength, 430 nm) as a light source was attached to the tip, to thereby obtain a light irradiator.

This light irradiator generates electric power in sunlight, and stores the electricity in the storage battery and usable for light irradiation. Thus, it is capable of light irradiation either in sunlight or indoors.

Production of Toy Main Body

In microcapsules made of a urethane resin were encapsulated 1 part of 1-ethyl-3,3-dimethyl-6-trifluoromethylindolino-6'-(−1-morpholino)naphthooxazine (y/x=0.06, x=60.92, y=3.62), 15 parts of a styrene/α-methylstyrene copolymer (trade name Piccolastic A-5, manufactured by Eastman Kodak Co.), 1 part of a light stabilizer, and 5 parts of 2,4-bis(2-hydroxy-4-butyloxyphenyl)-6-(2,4-bisbutyloxyphenyl)-1,3,5-triazine, thereby obtaining a photochromic microcapsule pigment (average particle diameter, 10 µm).

With 5 parts of the photochromic microcapsule pigment were mixed 10 parts of an acrylic resin emulsion, 0.5 parts of an antifoamer, and 1 part of a viscosity regulator, to thereby obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an ultraviolet absorber, 6 parts of a 50% xylene solution of an acrylic resin, 0.1 part of an antifoamer, 2 parts of xylene, and 2 parts of methyl isobutyl ketone was applied, so as to form a heart shape, by screen printing, thereby forming a light-absorbing layer (light-absorbing image). Thus, photochromic fabric was obtained.

The light-absorbing layer had a transmittance of 1% at a wavelength of 390 nm.

The photochromic fabric was cut and sewed to obtain a flat toy main body (photochromic sheet).

Regarding the photochromic toy configured of a combination of the light irradiator and the toy main body, when the toy main body was irradiated with light by using the light irradiator, the irradiated areas changed in color from white to red. Then, it was subsequently allowed to stand in the dark and, as a result, the red color disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Although the area surrounding the heart shape changed in color to red, the heart-shaped portion slightly changed in color. Upon irradiating with the light from the light irradiator to the heart-shaped portion in this state, the irradiated areas changed in color to deep red. Upon cessation of the light irradiation, the red color gradually became invisible. The suitability for repeated practical use in sunlight was satisfied.

Example 20

Production of Light Irradiator

A battery as an electric source was built in a main body made of a plastic, an LED (peak wavelength, 460 nm) as a light source was attached to the tip, and a switch was provided to the surface part, to thereby obtain a light irradiator.

Production of Toy Main Body

In microcapsules made of a urethane resin were encapsulated 1 part of 1,3,3-trimethyl-6'-(2,3-dihydro-1-indolino)spiroindolinenaphthooxazine (y/x=0.93, x=15.41, y=14.3), 15 parts of a styrene/α-methylstyrene copolymer (trade name Piccolastic A-5, manufactured by Eastman Kodak Co.), and 1 part of 2-[5-methyl-2-hydroxyphenyl] benzotriazole, thereby obtaining a photochromic microcapsule pigment (average particle diameter, 10 µm).

In 70 parts of a 15% xylene solution of an acrylic resin (trade name Paraloid B-72, manufactured by Rohm & Hass Co.) was dispersed 10 parts of the photochromic microcapsule pigment, and diluted by using xylene and methyl isobutyl ketone, thereby obtaining a photochromic coating material.

The photochromic coating material was applied with a spray gun, so as to form a heart pattern, to the surface of a duck-shaped molded object made of yellow polyvinyl chloride as a base, thereby forming a photochromic layer (photochromic image). Thus, a toy main body (photochromic figure) was obtained.

The photochromic toy configured of a combination of the light irradiator and the toy main body had been reduced in coloration caused by sunlight, and when the toy main body was irradiated with light by using the light irradiator, a deep-brown heart pattern appeared in the irradiated areas. Then, it was subsequently allowed to stand in the dark and, as a result, it changed again in color to the original yellow. The changes were able to be repeatedly caused. Since the light source had a peak light emission wavelength of 460 nm and emitted blue light, a highly safe photochromic toy exerting little influence on the human body was able to be obtained.

Example 21

Production of Light Irradiator

A battery as an electric source was built in a cylindrical main body (25 mm in diameter, 200 mm in length), an LED (peak wavelength, 430 nm) as a light source was attached to the tip, and a switch was provided to the surface part, to thereby obtain a light irradiator.

Production of Toy Main Body

In microcapsules made of a urethane resin were encapsulated 1 part of 3,3,10,10-tetraphenyl-3H,10H-naphtho[2,1-b:7,8-b']dipyran (y/x=0.23, x=24.13, y=5.55), 15 parts of a styrene/α-methylstyrene copolymer (trade name Piccolastic A-5, manufactured by Eastman Kodak Co.), and 10 parts of a mixture of bis(1,2,2,6,6-pentamethyl-4-piperidyl) sebacate and methyl 1,2,2,6,6-pentamethyl-4-piperidyl sebacate, to thereby obtain a photochromic microcapsule pigment (average particle diameter, 10 μm).

In 70 parts of a 15% xylene solution of an acrylic resin (trade name Paraloid B-72, manufactured by Rohm & Hass Co.) was evenly dispersed 10 parts of the photochromic microcapsule pigment, and diluted by using xylene and methyl isobutyl ketone, thereby obtaining a photochromic coating material.

The photochromic coating material was applied with a spray gun, so as to form a star shape, to the head of a doll made of flesh-colored polyvinyl chloride as a base, thereby forming a photochromic layer (photochromic image). Thus, a toy main body (photochromic doll) was obtained.

The photochromic toy configured of a combination of the light irradiator and the toy main body had been reduced in coloration caused by sunlight, and when the toy main body was irradiated with light by using the light irradiator, the irradiated areas changed in color from the flesh color to deep yellow, resulting in the appearance of a star-shaped image. Then, it was subsequently allowed to stand in the dark and, as a result, it changed again in color to the original flesh color. The changes were able to be repeatedly caused. Since the light source had a peak light emission wavelength of 430 nm and emitted blue light, a highly safe photochromic toy exerting little influence on the human body was able to be obtained.

Example 22

Production of Light Irradiator

A solar cell as an electric source was provided to the surface in a cylindrical main body (15 mm in diameter, 130 mm in length), and an LED (peak wavelength, 430 nm) as a light source was attached to the tip, thereby obtaining a light irradiator.

This light irradiator is capable of light irradiation in sunlight.

Production of Toy Main Body

In microcapsules made of a urethane resin were encapsulated 2 parts of 3,3-diphenyl-8-(2-(4-dimethylamino)phenyl)ethylenyl-3H-naphtho[4,3-b]pyran (y/x=0.27, x=71.13, y=19.20), 15 parts of a styrene/α-methylstyrene copolymer (trade name Piccolastic A-75, manufactured by Eastman Kodak Co.), and 1 part of bis(1,2,2,6,6-pentamethyl-4-piperidyl)[[3,5-bis(1,1-dimethylethyl)-4-hydroxyphenyl] methyl]butyl malonate, to thereby obtain a photochromic microcapsule pigment (average particle diameter, 10 μm).

With 5 parts of the photochromic microcapsule pigment were mixed 6 parts of an acrylic resin emulsion, 0.5 parts of an antifoamer, and 1 part of a viscosity regulator, to thereby obtain a photochromic ink.

The photochromic ink was printed by screen printing on the whole of a surface of white fabric as a base to form a photochromic layer. Furthermore, to the upper surface thereof, a colorless topcoating agent obtained by mixing 3 parts of an aqueous dispersion type ultraviolet absorber (trade name Tinuvin 400-DW, manufactured by BASF A.G.), 50 parts of an acrylic resin emulsion, 1 part of an antifoamer, and 2 parts of a viscosity regulator was applied by screen printing to form a light-absorbing layer. Thus, photochromic fabric was obtained.

The light-absorbing layer had a transmittance of 2% at a wavelength of 390 nm, a transmittance of 19% at a wavelength of 400 nm, and a transmittance of 41% at a wavelength of 410 nm.

The photochromic fabric was cut and sewed to obtain a flat toy main body (photochromic sheet).

Regarding the photochromic toy configured of a combination of the light irradiator and the toy main body, when the toy main body was irradiated with light by using the light irradiator, the irradiated areas changed in color from white to dark red and letters were able to be formed. Then, it was subsequently allowed to stand in the dark and, as a result, the dark-red letters disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

The toy main body changed little in color in sunlight. Consequently, upon irradiating with the light from the light irradiator, the irradiated areas changed in color to deep dark red and letters and images were able to be formed. Upon cessation of the light irradiation, the dark-red letters and images gradually became invisible. The suitability for repeated practical use in sunlight was satisfied.

Example 23

Production of Light Irradiator

A battery as an electric source was built in a main body made of a plastic, an LED (peak wavelength, 460 nm) as a light source was attached to the tip, and a switch was provided to the surface part, to thereby obtain a light irradiator.

Production of Toy Main Body

In microcapsules made of a urethane resin were encapsulated 1 part of 3,3-diphenyl-8-(1H-benzotriazol-1-yl)carbonyl-3H-naphtho[4,3-b]pyran (y/x=0.06, x=18.20, y=1.09), 15 parts of a styrene/α-methylstyrene copolymer (trade name Piccolastic A-5, manufactured by Eastman Kodak Co.), and 20 parts of 2-[4-[(2-hydroxy-3-(2'-ethyl)hexyl)oxy]-2-hydroxyphenyl]-4,6-bis(2,4-dimethylphenyl)-1,3,5-triazine, thereby obtaining a photochromic microcapsule pigment (average particle diameter, 10 µm).

In 70 parts of a 15% xylene solution of an acrylic resin (trade name Paraloid B-72, manufactured by Rohm & Hass Co.) was dispersed 10 parts of the photochromic microcapsule pigment, and diluted by using xylene and methyl isobutyl ketone, thereby obtaining a photochromic coating material.

The photochromic coating material was applied with a spray gun, so as to form a heart pattern, to the surface of a swan-shaped molded object made of white polyvinyl chloride as a base, thereby forming a photochromic layer (photochromic image). Thus, a toy main body (photochromic figure) was obtained.

The photochromic toy configured of a combination of the light irradiator and the toy main body had been reduced in coloration caused by sunlight, and when the toy main body was irradiated by using the light irradiator, a deep-orange heart pattern appeared in the irradiated areas. Then, it was subsequently allowed to stand in the dark and, as a result, it changed again in color to the original white. The changes were able to be repeatedly caused. Since the light source had a peak light emission wavelength of 460 nm and emitted blue light, a highly safe photochromic toy exerting little influence on the human body was able to be obtained.

Example 24

Production of Light Irradiator

A solar cell as an electric source was provided to the surface in a cylindrical main body (15 mm in diameter, 130 mm in length), and an LED (peak wavelength, 430 nm) as a light source was attached to the tip, thereby obtain a light irradiator.

This light irradiator is capable of light irradiation in sunlight.

Production of Toy Main Body

In microcapsules made of a urethane resin were encapsulated 2 parts of 3,3,9,9-tetraphenyl-3H,9H-naphtho[2,1-b:6,5-b']dipyran (y/x=0.12, x=21.30, y=2.56), 15 parts of a styrene/α-methylstyrene copolymer (trade name Piccolastic A-75, manufactured by Eastman Kodak Co.), and 5 parts of 2-(2H-benzotriazol-2-yl)-4,6-bis(1-methyl-1-phenylethyl)phenol, to thereby obtain a photochromic microcapsule pigment (average particle diameter, 10 µm).

With 5 parts of the photochromic microcapsule pigment were mixed 6 parts of an acrylic resin emulsion, 0.5 parts of an antifoamer, and 1 part of a viscosity regulator, to thereby obtain a photochromic ink.

The photochromic ink was printed by screen printing on the whole of a surface of white fabric as a base to form a photochromic layer. Furthermore, to the upper surface thereof, a colorless topcoating agent obtained by mixing 5 parts of an ultraviolet absorber (trade name Tinuvin 328, manufactured by BASF A.G.), 20 parts of a xylene solution of an acrylic resin, 1 part of an antifoamer, and 2 parts of a viscosity regulator was applied by screen printing to form a light-absorbing layer. Thus, photochromic fabric was obtained.

The light-absorbing layer had a transmittance of 4% at a wavelength of 390 nm, a transmittance of 6% at a wavelength of 400 nm, and a transmittance of 20% at a wavelength of 410 nm.

The photochromic fabric was cut and sewed to obtain a flat toy main body (photochromic sheet).

Regarding the photochromic toy configured of a combination of the light irradiator and the toy main body, when the toy main body was irradiated with light by using the light irradiator, the irradiated areas changed in color from white to orange and letters were able to be formed. Then, it was subsequently allowed to stand in the dark and, as a result, the orange letters disappeared and the irradiated areas changed in color to the original white. The changes were able to be repeatedly caused. Since the light source had a peak light emission wavelength of 430 nm and emitted blue light, a highly safe photochromic toy exerting little influence on the human body was able to be obtained.

The toy main body changed little in color in sunlight, and upon irradiating with the light from the light irradiator in this state, the irradiated areas changed in color to deep orange and letters and images were able to be formed. Upon cessation of the light irradiation, the orange letters and images gradually became invisible. The suitability for repeated practical use in sunlight was satisfied.

Example 25

Production of Stencil Sheet

By using an opaque ink, an elaborate dinosaurian picture having a photographic tone was formed as a negative design (negative-film form) by screen printing on a surface of a transport polyvinyl chloride sheet. Thus, a stencil sheet was obtained.

Production of Light Irradiator

A battery as an electric source was built in a cylindrical main body (25 mm in diameter, 200 mm in length), an LED (peak wavelength, 430 nm) as a light source was attached to the tip, and a switch was provided to the surface part, to thereby obtain a light irradiator.

Production of Toy Main Body

In microcapsules made of a urethane resin were encapsulated 2 parts of 1,3,3-trimethyl-8'-cyanospiro[benzo[e]indoline-2,3'-[3H]naphtho[2,1-b][1,4]oxazine (y/x=0.09, x=18.59, y=1.67) and 15 parts of a styrene/α-methylstyrene copolymer (trade name Piccolastic A-75, manufactured by Eastman Kodak Co.), thereby obtaining a photochromic microcapsule pigment (average particle diameter, 10 µm).

With 5 parts of the photochromic microcapsule pigment were mixed 6 parts of an acrylic resin emulsion, 0.5 parts of an antifoamer, and 1 part of a viscosity regulator to obtain a photochromic ink.

The photochromic ink was printed by screen printing on the whole of a surface of synthetic paper of a pink color as a base to form a photochromic layer. Furthermore, to the upper surface thereof, a colorless topcoating agent obtained by mixing 3 parts of an aqueous dispersion type ultraviolet absorber (product name Tinuvin 477-DW, manufactured by BASF A.G.), 50 parts of an acrylic resin emulsion, 1 part of an antifoamer, and 2 parts of a viscosity regulator was applied by screen printing to form a light-absorbing layer. Thus, a photochromic synthetic paper was obtained.

The light-absorbing layer had a transmittance of 2% at a wavelength of 390 nm.

The photochromic synthetic paper was cut into a square shape to obtain a flat toy main body (photochromic sheet).

Regarding the photochromic toy configured of a combination of the light irradiator, the toy main body and the stencil sheet, when the stencil sheet was placed on the toy main body and they were irradiated with light by using the light irradiator, the irradiated areas changed in color from pink to purple and a dinosaurian image due to the stencil sheet was able to be formed. Then, it was subsequently allowed to stand in the dark and, as a result, the dinosaurian image disappeared and it changed in color to the original white. The changes were able to be repeatedly caused. Since the light source had a peak light emission wavelength of 430 nm and emitted blue light, a highly safe photochromic toy exerting little influence on the human body was able to be obtained.

Comparative Example 1

Production of Light Irradiator

A battery as an electric source was built in a cylindrical main body (20 mm in diameter, 150 mm in length), an LED (peak wavelength, 430 nm) as a light source was attached to the tip, and a switch was provided to the surface part, to thereby obtain a light irradiator 1.

Production of Toy Main Body

A photochromic coating material was obtained in the same manner as in Example 1, except that the 1,3,3-trimethyl-6'-(1-piperidinyl)spiroindolinenaphthooxazine (y/x=0.03) used in Example 1 was replaced with 1,3,3-trimethylspiroindolinenaphthooxazine (y/x=0.016, x=41.93, y=0.69).

The photochromic coating material was applied with a spray gun to a miniature car made of white ABS as a base to form a photochromic layer. Thus, a toy main body (photochromic miniature car) was obtained.

Regarding the photochromic toy configured of a combination of the light irradiator and the toy main body, when the toy main body was irradiated by using the light irradiator, the irradiated areas changed in color from white to light blue. However, it was substantially impossible to visually recognize the color change. Thus, the suitability for practical use required of photochromic toys was not satisfied.

Comparative Example 2

Production of Light Irradiator

A battery as an electric source was built in a cylindrical main body (20 mm in diameter, 150 mm in length), an LED (peak wavelength, 430 nm) as a light source was attached to the tip, and a switch was provided to the surface part, to thereby obtain a light irradiator 1.

Production of Toy Main Body

A photochromic coating material was obtained in the same manner as in Example 1, except that the 1,3,3-trimethyl-6'-(1-piperidinyl)spiroindolinenaphthooxazine (y/x=0.03) used in Example 1 was replaced with 3,3-bis(4-methoxyphenyl)-3H-naphtho[2,1-b]pyran (y/x=0.00, x=51.51, y=0).

The photochromic coating material was applied with a spray gun to a miniature car made of white ABS as a base to form a photochromic layer. Thus, a toy main body (photochromic miniature car) was obtained.

Regarding the photochromic toy configured of a combination of the light irradiator and the toy main body, even when the toy main body was irradiated with light by using the light irradiator, the irradiated areas remained white and it was impossible to visually recognize any color change.

Comparative Example 3

Production of Light Irradiator

A battery as an electric source was built in a cylindrical main body (25 mm in diameter, 200 mm in length), an LED (peak wavelength, 430 nm) as a light source was attached to the tip, and a switch was provided to the surface part, to thereby obtain a light irradiator 1.

Production of Toy Main Body

A photochromic coating material was obtained in the same manner as in Example 17, except that the 1,3,3-trimethyl-6-trifluoromethylindolino-6'-(1-piperidinyl)naphthooxazine (y/x=0.06, x=60.92, y=3.62) used in Example 17 was replaced with 1,3,3-trimethylspiroindolinenaphthooxazine (y/x=0.16, x=41.93, y=0.69).

The photochromic coating material was applied with a spray gun, so as to form a star shape, to the head of a doll made of flesh-colored polyvinyl chloride as a base, thereby forming a photochromic layer (photochromic image). Thus, a toy main body (photochromic doll) was obtained.

Regarding the photochromic toy configured of a combination of the light irradiator and the toy main body, when the toy main body was irradiated with light by using the light irradiator, the irradiated areas changed in color from white to light red. However, it was substantially impossible to visually recognize the color change. Thus, the suitability for practical use required of photochromic toys was not satisfied.

Comparative Example 4

Production of Light Irradiator

A battery as an electric source was built in a cylindrical main body (25 mm in diameter, 200 mm in length), an LED (peak wavelength, 430 nm) as a light source was attached to the tip and a switch was provided to the surface part, to thereby obtain a light irradiator 1.

Production of Toy Main Body

A photochromic coating material was obtained in the same manner as in Example 17, except that the 1,3,3-trimethyl-6-trifluoromethylindolino-6'-(1-piperidinyl)naphthooxazine (y/x=0.06, x=60.92, y=3.62) used in Example 17 was replaced with 3,3-bis(4-methoxyphenyl)-3H-naphtho[2,1-b]pyran (y/x=0.00, x=51.51, y=0).

The photochromic coating material was applied with a spray gun, so as to form a star shape, to the head of a doll made of flesh-colored polyvinyl chloride as a base, thereby forming a photochromic layer (photochromic image). Thus, a toy main body (photochromic doll) was obtained.

Regarding the photochromic toy configured of a combination of the light irradiator and the toy main body, even when the toy main body was irradiated with light by using the light irradiator, the irradiated areas remained white and it was impossible to visually recognize any color change.

While the present invention has been described in detail and with reference to specific embodiments thereof, it will be apparent to one skilled in the art that various changes and modifications can be made therein without departing from the spirit and scope thereof.

This application is based on Japanese patent application 2011-154488, filed on Jul. 13, 2011, Japanese patent application 2012-136454, filed on Jun. 16, 2012, and Japanese patent application 2012-136455, filed on Jun. 16, 2012, the contents thereof being incorporated herein by reference.

DESCRIPTION OF REFERENCE NUMERALS AND SIGNS

1 Photochromic toy
2 Light irradiator
21 Main body
22 Electric source
23 Light source
3 Toy main body

The invention claimed is:

1. A photochromic toy comprising:
a light irradiator equipped with a light source;
a toy main body containing a photochromic compound; and
a light-absorbing layer configured to absorb light having wavelengths of 400 nm or less disposed on the toy main body,
wherein
the light source has a peak wavelength in a range from 400 nm to 495 nm,
wherein the photochromic compound satisfies expression (1), the expression (1) being defined as: $y/x \geq 0.02$, where x is a first integral of absorbance in a first wavelength range from a specific wavelength to 400 nm, the specific wavelength being less than 400 nm and corresponding to a maximum absorbance of the photochromic compound in a wavelength range of less than 400 nm, and y is a second integral of absorbance in a second wavelength range from 400 nm to 700 nm,
wherein the photochromic compound is selected from a group consisting of spirooxazine derivatives, spiropyran derivatives, and naphthopyran derivatives, and wherein the light-absorbing layer has a transmittance less than 5% at a wavelength of 390 nm.

2. The photochromic toy according to claim 1, wherein the toy main body comprises a base and a photochromic layer and the photochromic layer contains the photochromic compound.

3. The photochromic toy according to claim 1, wherein the light source is a light-emitting diode (LED).

4. The photochromic toy according to claim 1, further comprising an ultraviolet-absorbing layer disposed on a surface of the light source.

5. The photochromic toy according to claim 1, wherein the toy main body contains a photochromic microcapsule, and the photochromic microcapsule encloses the photochromic compound and an ultraviolet absorber.

6. The photochromic toy according to claim 5, wherein a mass ratio of the photochromic compound to the ultraviolet absorber ranges from 1:0.01 to 1:100.

7. The photochromic toy according to claim 1, wherein the light irradiator is further equipped with a solar cell.

8. The photochromic toy according to any claim 1, wherein the light irradiator is further equipped with a storage battery.

9. The photochromic toy according to claim 1, wherein the toy main body is further equipped with an electric source, and the electric source has been connected to the light source by wiring.

10. The photochromic toy according to claim 1, further equipped with at least one of a first stencil having light-shielding properties and a second stencil including a layer which absorbs light having wavelengths in the range from 400 to 495 nm.

11. The photochromic toy according to claim 2, wherein the photochromic layer further contains at least one of a phosphorescent material, a fluorescent material, and a layer containing one of the phosphorescent material and the fluorescent material disposed beneath the photochromic layer.

* * * * *